W. T. BEYER.
INSECT DESTROYER.
APPLICATION FILED JUNE 3, 1912.
1,059,024.
Patented Apr. 15, 1913.
2 SHEETS—SHEET 1.
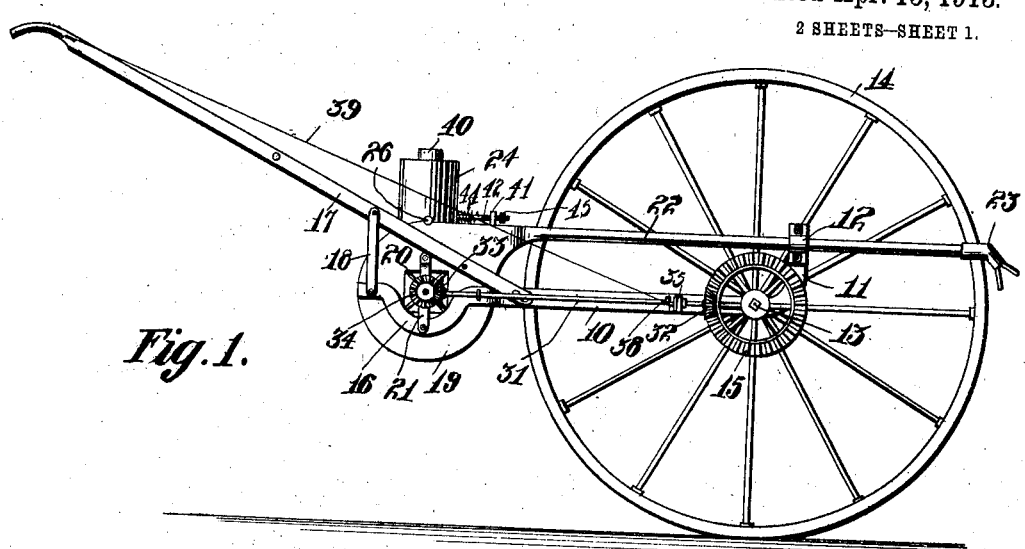
Fig. 1.
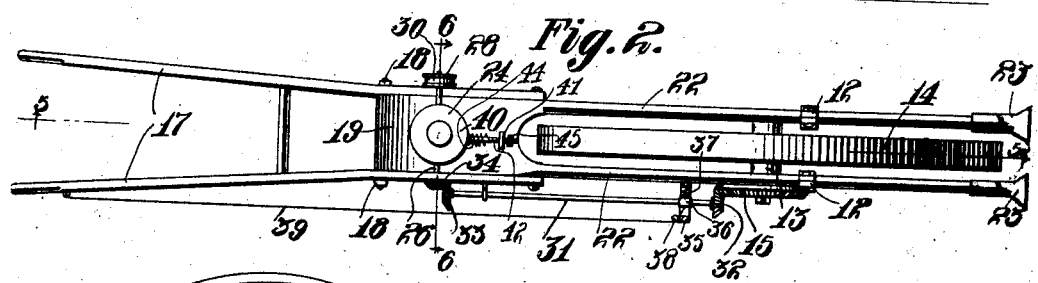
Fig. 2.
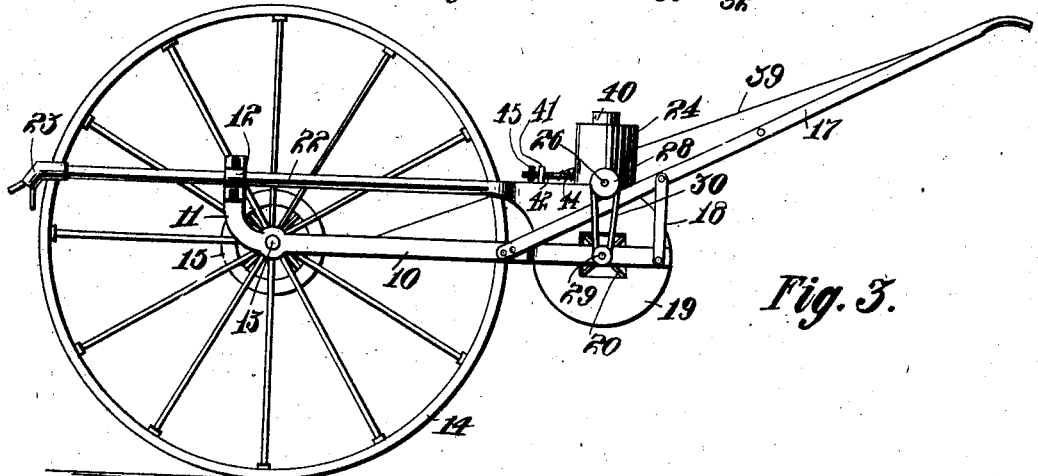
Fig. 3.
Witnesses
W. C. Fielding
J. H. M. Test
Inventor
W. T. Beyer
By 
Attorneys

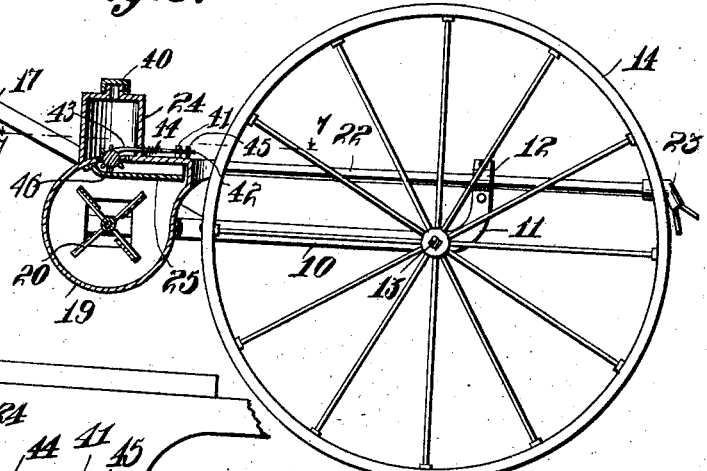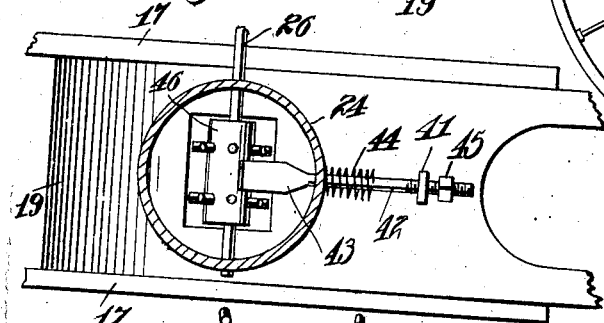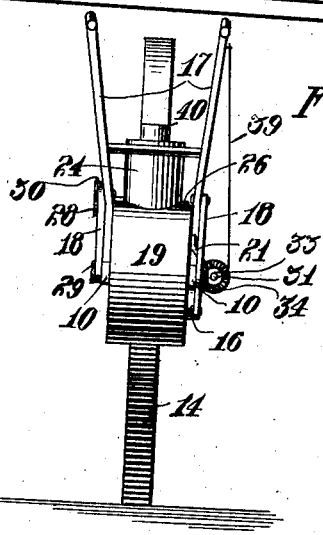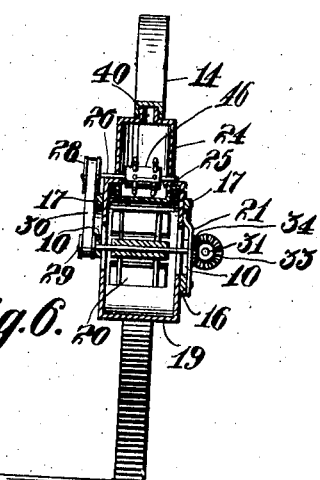

UNITED STATES PATENT OFFICE.

WILLIAM T. BEYER, OF PADUCAH, KENTUCKY.

INSECT-DESTROYER.

1,059,024.

Specification of Letters Patent. Patented Apr. 15, 1913.

Application filed June 3, 1912. Serial No. 701,326.

*To all whom it may concern:*

Be it known that I, WILLIAM T. BEYER, a citizen of the United States, residing at Paducah, in the county of McCracken, State of Kentucky, have invented certain new and useful Improvements in Insect-Destroyers; and I do hereby declare the following to be a full, clear, and exact description of the invention, such as will enable others skilled in the art to which it appertains to make and use the same.

This invention relates to improvements in insect destroyers, and has particular reference to a device for injecting or spraying powdered insecticide on to plants.

The principal object of the invention is to provide a simple device of this character which may be pulled down between the rows of standing plants, the dust being projected on to the plant in a convenient manner, and danger of the same blowing in the operator's eyes obviated.

Other objects and advantages will be apparent from the following description and with particular reference to the accompanying drawings.

In the drawings: Figure 1 is a side elevation of my insect destroying machine, Fig. 2 is a top plan view, Fig. 3 is a side elevation, from the opposite side of the machine, Fig. 4 is a rear elevation, Fig. 5 is a vertical longitudinal sectional view on the line 5—5 of Fig. 2, and Fig. 6 is a vertical transverse sectional view on the line 6—6 of Fig. 2. Fig. 7 is an enlarged horizontal fragmentary detail sectional view on the line 7—7 of Fig. 5.

Referring particularly to the drawings, my invention comprises the bars 10 horizontally disposed, having the rear ends turned up as at 11 and clips 12 mounted on the upper ends of the said portions 11. Journaled in the bars 10 adjacent the upturned portions 11 is an axle 13, carrying a ground engaging or supporting wheel 14 on one end, and on the other end a large beveled pinion 15. The front end of one of the bars 10 is downwardly curved as at 16. Secured near the front ends of the bars 10 are the upwardly and forwardly extending handle bars 17 suitably braced by means of the brace bars 18, which are secured at their opposite ends respectively to the bar 10 and to the handle bars. There are two of these bars 10, and between the front ends thereof is mounted a fan casing 19, in which is mounted a rotary fan 20, one of the trunnions of said fan being suitably journaled in a block 21 at one end mounted in the said curved portion 16 of one of the bars 10, while the other trunnion is journaled in the other bar 10. Connected to the upper portion of the fan casing and extending rearwardly are the pipes 22, said pipes being held to the frame by means of the clips 12, before-mentioned. The rearward extremity of each of the pipes 22 is provided with a rotatable spraying nozzle or rose 23, from which the dust or insect powder is sprayed and which may be rotated to discharge the powder at any angle according to the heights of the plants. Mounted on the top of the fan casing 19 is a tank 24, which is adapted to contain the insecticide and communicates with the fan casing by means of the downwardly and rearwardly extending nozzle 25. Extending transversely through the bottom of the tank 24 is a shaft 26 which carries inwardly of the tank an agitator for keeping the powder from packing in the bottom of the tank. On one of the ends of the shaft is a pulley wheel 28 which receives motion from a pulley 29 on the fan shaft by means of the belt 30. Thus when the device is pulled down between the rows of plants, motion will be transmitted by means of the pinion 15 to the shaft 31 loosely supported at its front end on one of the bars 10 and carrying on its rear end a pinion 32 for engagement with the pinion 15. The opposite end of said shaft 31 is provided with a small pinion 33 engaging with a similar pinion 34 on the fan shaft. This transmits power to the fan shaft to drive the fan.

On the bar 10 adjacent the pinion 32 is a slotted bracket 35 in which is slidably mounted a block 36 carried loosely by the shaft 31, a spring 37 being secured at its ends respectively to the block and to the bracket, to hold the shaft in such position that the pinion 32 is normally in mesh with the pinion 15. Secured to the opposite side of the block 36 and extending through a guide eye 38 is a cord 39, which extends forwardly to the handles 17 within convenient reach of the operator, so that he may pull the pinion 32 out of mesh with the pinion 15 to stop the operation of the device. Upon release of the cord the spring 37 will draw the shaft so that the pinions will return to engagement. The tank 24 is provided with a screw cap 40 for closing the filling openings thereof.

Mounted on the fan casing is an apertured guide lug 41, through which extends a bolt 42. On the inner end of the bolt is a plate 43 the inner end of which bears frictionally on the agitating roller 46, between the rows of teeth, for regulating the speed of said roller and consequently the flow of powder from the receptacle 24. The outer end of the bolt inwardly of the lug carries an adjusting nut 45. On the bolt, between the nut and the receptacle, is a coil spring 44, the outer end of the spring being secured to the bolt.

As the device is wheeled between the rows of plants the fan is rotated to blow air through the pipes 22. This causes a suction at the discharge end of the nozzle 25 which results in powder being blown through the pipes 22, and out through the nozzles or roses 23 onto the plants.

What is claimed is:

1. In a device for distributing powdered insecticide, a wheel supported frame, comprising parallel bars having upturned rear ends, a pinion on the axle, a blast fan rotatably mounted on the forward end of the bars of the frame and driven from the pinion, an insecticide tank mounted on the casing of the fan and discharging insecticide to the fan, pipes connected to the fan and extending rearwardly of the machine, said pipes being supported on the said upturned ends of the bars, and spraying nozzles on the rear ends of said pipes.

2. In an insecticide spraying device, a frame comprising parallel bars having upturned rear ends, an axle mounted near the rear ends of the bars, a wheel on the axle, a beveled pinion on one end of the axle, a fan casing mounted in the forward ends of the bars of the frame, a blast fan mounted in the casing, a shaft extending longitudinally on one of the bars of the frame, a pinion on one end of the said shaft engaging with the axle carried pinion, a pinion on the fan shaft, a pinion on the opposite end of the shaft for engagement with the fan shaft pinion, a slotted bracket on the frame adjacent the wheel, a block carried by the longitudinal shaft slidable in the bracket, a spring for normally holding the block and shaft so that the adjacent pinion is in engagement with the axle carried pinion, a cord connected to the sliding block for moving the shaft to disengage the pinion, and pipes connected to the fan casing, said pipes extending rearwardly and being supported on the said upturned ends of the frame bars.

In testimony whereof, I affix my signature, in presence of two witnesses.

WILLIAM T. BEYER.

Witnesses:
MOSES MARKS,
LOUIS KILKOSOLA.